United States Patent [19]

Tzikas et al.

[11] Patent Number: 5,128,456
[45] Date of Patent: Jul. 7, 1992

[54] REACTIVE DYES

[75] Inventors: Athanassios Tzikas, Pratteln; Paul Herzig, Basel, both of Switzerland

[73] Assignee: Ciba-Geigy Corporation, Ardsley, N.Y.

[21] Appl. No.: 604,551

[22] Filed: Oct. 26, 1990

[30] Foreign Application Priority Data

Nov. 1, 1989 [CH] Switzerland .................. 3939/89

[51] Int. Cl.$^5$ .................. C09B 62/085; C09B 67/26; D06P 1/382
[52] U.S. Cl. .................. 534/638; 534/632; 8/527; 8/549
[58] Field of Search .................. 534/638

[56] References Cited

U.S. PATENT DOCUMENTS 2,945,022 7/1960 Fasciati .................. 534/638 X
3,151,105 9/1964 Andrew .................. 534/638

FOREIGN PATENT DOCUMENTS 0230219 7/1987 European Pat. Off. .
2436166 9/1979 France .
2031932 4/1980 United Kingdom .

OTHER PUBLICATIONS

Nippon Chemical Abstract vol. 101, 74298d (1984).

Primary Examiner—Mary C. Lee
Assistant Examiner—Fiona T. Powers
Attorney, Agent, or Firm—Marla J. Mathias; Edward McC. Roberts

[57] ABSTRACT

Novel reactive dyes of the formula

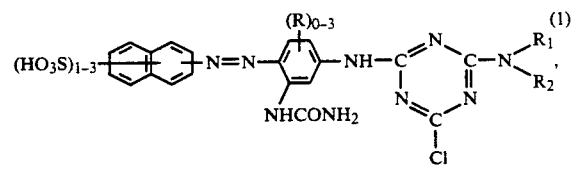

in which $(R)_{0-3}$ is 0–3 substituents R, independent of one another, from the group comprising halogen, nitro, cyano, trifluoromethyl, sulfamoyl, carbamoyl, $C_{1-4}$alkyl, $C_{1-4}$alkoxy, amino, acetylamino, ureido, hydroxyl, carboxyl, sulfomethyl and sulfo, $R_1$ is hydrogen, $C_{1-8}$alky or $C_{5-7}$cycloalkyl and $R_2$ is $C_{1-8}$alkyl or $C_{5-7}$cycloalkyl, it being possible for the alkyl and cycloalkyl radicals $R_1$ and $R_2$ to be substituted independently of one another by hydroxyl, $C_{1-4}$alkoxy, hydroxy-$C_{1-4}$alkoxy, HO—$(CH_2CH_2$—$O)_{2-4}$—, sulfato-$C_{1-4}$alkoxy, $C_{2-4}$alkanoyl, $C_{1-4}$alkoxy-carbonyl, $C_{2-4}$alkanoyloxy, carboxyl, cyano, halogen, $C_{1-4}$alkylamino, or N,N-Di-$C_{1-4}$alkylamino, or sulfato, or in which $R_1$ is $C_{1-8}$alkyl or $C_{5-7}$cycloalkyl, and the alkyl or cycloalkyl radical can be substituted as defined, and $R_2$ is a $C_{1-8}$alkyl or $C_{5-7}$cycloalkyl radical which is substituted by sulfo, give deep yellow to orange dyeings and prints with good fastness properties on cellulose fibres.

2 Claims, No Drawings

REACTIVE DYES

Reactive dyes are widely used for dyeing and printing textile fibre materials. Although a large number of useful reactive dyes having different properties are currently available for various fields of use, the prior art achieved often is not yet completely satisfactory in view of the high requirements in respect of suitability for certain dyeing processes and the fastness level of the dyeings.

This also applies to reactive dyes used in processes for printing textile fibre materials. The present range of high-quality printing dyes generally still contains gaps, especially taking into account the shade. The provision of further improved reactive dyes is therefore urgently desired.

The object of the present invention is to discover novel reactive dyes which are suitable for dyeing processes, in particular for processes for printing textile fibre materials, and have a high degree of fixing and at the same time result in non-fixed portions which are easy to wash out; the dyes should furthermore have generally good fastness properties and in particular shades in the range from yellow to reddish-tinged yellow. It has been found that the novel dyes defined below largely meet the stated object.

The invention thus relates to reactive dyes of the formula

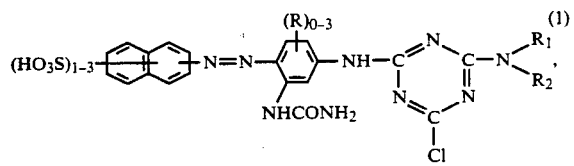

in which $(R)_{0-3}$ is 0–3 substituents R, independent of one another, from the group comprising halogen, nitro, cyano, trifluoromethyl, sulfamoyl, carbamoyl, $C_{1-4}$alkyl, $C_{1-4}$alkoxy, amino, acetylamino, ureido, hydroxyl, carboxyl, sulfomethyl and sulfo, $R_1$ is hydrogen, $C_{1-8}$alky or $C_{5-7}$cycloalkyl and $R_2$ is $C_{1-8}$alkyl or $C_{5-7}$cycloalkyl, it being possible for the alkyl and cycloalkyl radicals $R_1$ and $R_2$ to be substituted independently of one another by hydroxyl, $C_{1-4}$alkoxy, hydroxy-$C_{1-4}$alkoxy, HO—(CH$_2$—CH$_2$—O)$_{2-4}$—, sulfato-$C_{1-4}$alkoxy, $C_{2-4}$alkanoyl, $C_{1-4}$alkoxy-carbonyl, $C_{2-4}$alkanoyloxy, carboxyl, cyano, halogen, $C_{1-4}$alkylamino, or N,N-Di-$C_{1-4}$alkylamino, or sulfato, or in which $R_1$ is $C_{1-8}$alkyl or $C_{5-7}$cycloalkyl, and the alkyl or cycloalkyl radical can be substituted as defined, and $R_2$ is a $C_{1-8}$alkyl or $C_{5-7}$cycloalkyl radical which is substituted by sulfo.

Halogen R is: fluorine, chlorine or bromine; $C_{1-4}$alkyl R is methyl, ethyl, propyl, isopropyl, butyl, isobutyl, sec.-butyl or tert-butyl; and $C_{1-4}$alkoxy R is: methoxy, ethoxy, propoxy, isopropoxy, butoxy, isobutoxy, sec-butyoxy or tert-butoxy.

$C_{1-8}$Alkyl $R_1$ and $R_2$ is, for example: methyl, ethyl, isopropyl, n-propyl, isobutyl, n-butyl, sec-butyl, tert-butyl, n-pentyl, n-hexyl, 2-methyl-n-hexyl or n-octyl, it being possible for these radicals to be substituted as defined under formula (1); $C_{1-4}$alkoxy being, for example, methoxy, ethoxy, isopropoxy, n-propoxy, sec-butoxy, isobutoxy, tert-butoxy or n-butoxy; hydroxy-$C_{1-4}$alkoxy being, for example, hydroxymethoxy, β-hydroxyethoxy, β-hydroxy-n-propoxy or γ-hydroxypropoxy; HO—(CH$_2$CH$_2$—O)$_{2-4}$— being, for example, HO—CH$_2$CH$_2$—O—CH$_2$CH$_2$—O—, HO—CH$_2$CH$_2$—O—CH$_2$CH$_2$—O—CH$_2$CH$_2$—O— or HO—CH$_2$CH$_2$—O—CH$_2$CH$_2$—O—CH$_2$CH$_2$—O—CH$_2$CH$_2$—O—; sulfato-$C_{1-4}$alkoxy being, for example, β-sulfatoethoxy; $C_{2-4}$alkanoyl being, for example, acetyl, propionyl or butyryl; $C_{1-4}$alkoxycarbonyl being, for example, methoxycarbonyl or ethoxycarbonyl; $C_{2-4}$alkanoyloxy being, for example, acetoxy, propionyloxy or butyryloxy; $C_{1-4}$alkylamino being, for example, methylamino; and di-$C_{1-4}$alkylamino being, for example, N,N-dimethylamino.

$C_{5-7}$Cycloalkyl $R_1$ and $R_2$ is a cyclopentyl, cyclohexyl or cycloheptyl radical, which can be substituted as defined above for the alkyl radicals $R_1$ and $R_2$.

Reactive dyes of the formula

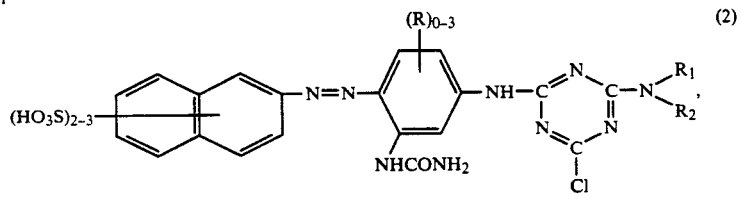

in which $(R)_{0-3}$, $R_1$ and $R_2$ are as defined under formula (1), in particular in which, in formula (2), the alkyl radicals $R_1$ and $R_2$ are a $C_{1-6}$alkyl radical, preferably a $C_{1-4}$alkyl radical, which can be substituted as defined, and the cycloalkyl radicals $R_1$ and $R_2$ are a cyclohexyl radical, which can be substituted as defined, are preferred.

Reactive dyes of the formula

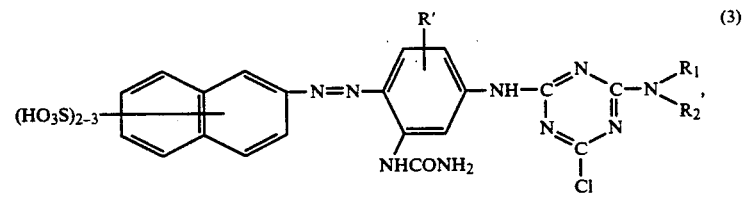

in which R' is hydrogen, halogen, in particular chlorine, $C_{1-4}$alkoxy, in particular methoxy, or $C_{1-4}$alkyl, in particular methyl, and $R_1$ and $R_2$ are as defined under formula (2) are particularly preferred.

Reactive dyes of the formula

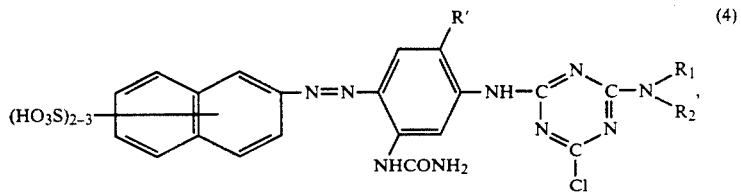

(4)

in which R', R₁ and R₂ are as defined under formula (3), are especially preferred.

Reactive dyes of the formula

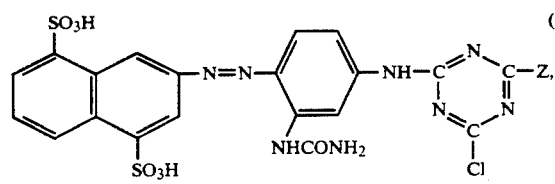

(5)

in which Z is hydroxy-$C_{1-4}$alkylamino, sulfato-$C_{1-4}$alkylamino, hydroxy-$C_{1-4}$alkoxy-$C_{1-4}$alkylamino, sulfato-$C_{1-4}$alkoxy-$C_{1-4}$alkylamino, N-$C_{1-4}$alkyl-N-hydroxy-$C_{1-4}$alkylamino, N-$C_{1-4}$alkyl-N-sulfato-$C_{1-4}$alkylamino, N,N-di(hydroxy-$C_{1-4}$alkyl)-amino, N,N-di(sulfato-$C_{1-4}$alkyl)-amino, —NH—(CH₂CH₂—O)₂₋₄—CH₂CH₂—OH or N—$C_{1-4}$alkyl-N-(CH₂CH₂—O)₂₋₄—CH₂CH₂—OH are important.

Reactive dyes of the formula

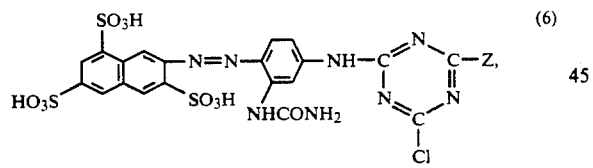

(6)

in which Z is hydroxy-$C_{1-4}$alkylamino, sulfato-$C_{1-4}$alkylamino, hydroxy-$C_{1-4}$alkoxy-$C_{1-4}$alkylamino, sulfato-$C_{1-4}$alkoxy-$C_{1-4}$alkylamino, N-$C_{1-4}$alkyl—N—hydroxy-$C_{1-4}$alkylamino, N-$C_{1-4}$alkyl-N-sulfato-$C_{1-4}$alkylamino, N,N-di(hydroxy-$C_{1-4}$-alkyl)-amino, N,N-di(sulfato-$C_{1-4}$alkyl)-amino, —NH—(CH₂CH₂—O)₂₋₄—CH₂CH₂—OH or —N—$C_{1-4}$alkyl—N—(CH₂CH₂—O)₂₋₄—CH₂CH₂—OH are likewise important.

Reactive dyes of the formulae (5) and (6) in which Z is β-hydroxyethylamino, β-sulfatoethylamino, β-(β'-hydroxyethoxy)-ethylamino, β-(β'-sulfatoethoxy)-ethylamino, hydroxymethoxymethylamino, sulfatomethoxymethylamino, N-methyl-N-β-hydroxyethylamino, N-methyl-N-β-sulfatoethylamino, N-ethyl-N-β-hydroxyethylamino, N-ethyl-N-β-sulfatoethylamino, N,N-di-(β-hydroxyethyl)-amino, N,N-di-(β-sulfatoethyl)-amino, —NH—(CH₂CH₂—O)₂—CH₂CH₂—OH, —NH—(CH₂CH₂—O)₃—CH₂CH₂—OH, —NH—(CH₂CH₂—O)₄—CH₂CH₂—OH or N-methyl-N-β-(β'-hydroxyethoxy)-ethylamino are particularly important.

Reactive dyes of the formula (6) in which Z is β-hydroxyethylamino, β-sulfatoethylamino, β-(β'-hydroxyethoxy)-ethylamino, N,N-di-(β-hydroxyethyl)-amino, ethylamino, N,N-diethylamino, cyclohexylamino, carboxymethylamino, N-methyl-N-carboxymethylamino, γ-N,N-dimethylamino-n-propylamino, β-methoxyethylamino or N-methyl-N-β-sulfoethylamino are furthermore of interest.

The reactive dye of the formula

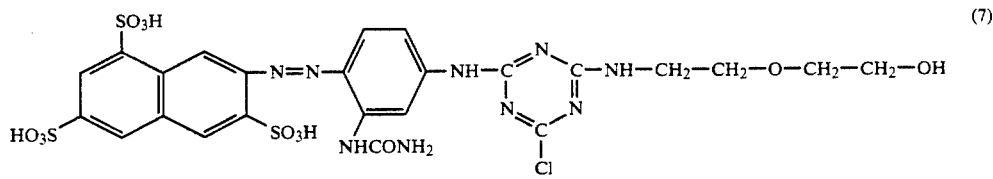

(7)

is especially important.

The dyes of the formulae (1) to (7) are fiber-reactive since they contain a chlorine atom which can be split off in the s-triazine radical. Fibre-reactive compounds are to be understood as meaning those which are capable of reacting with the hydroxyl groups of cellulose, the amino, carboxyl, hydroxyl and thiol groups of wool and silk or the amino and any carboxyl groups of synthetic polyamides to form covalent chemical bonds.

The process for the preparation of the reactive dyes of the formula (1) comprises coupling a diazotized diazo component of the formula

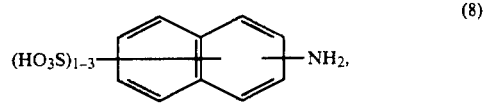

(8)

to a coupling component of the formula

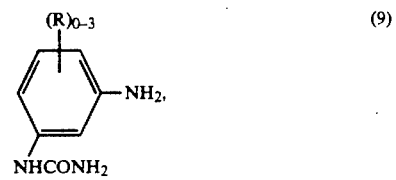

(9)

and subjecting the aminomonoazo compound thus obtained and an amine of the formula

(10)

to a condensation reaction with 2,4,6-trichloro-s-triazine in any order.

Since the condensation reactions can be carried out in different orders, two process variants are possible.

The two process variants comprise 1. coupling a diazotized diazo component of the formula (8) with a coupling component of the formula (9), subjecting the resulting aminomonoazo compound to a condensation reaction with 2,4,6-trichloro-s-triazine and subjecting the primary condensation product to a condensation reaction with an amine of the formula (10).

2. First subjecting 2,4,6-trichloro-s-triazine to a condensation reaction with an amine of the formula (10) and subjecting the resulting primary condensation product to a condensation reaction with the aminomonoazo compound prepared as in 1.

The preferred mode of preparation of the reactive dye of the formula (7) comprises preparing a monoazo compound of the formula

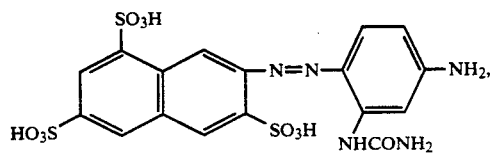

(11)

subjecting this to a condensation reaction with 2,4,6-trichloro-s-triazine and subjecting the resulting dichloro-triazine-azo compound of the formula

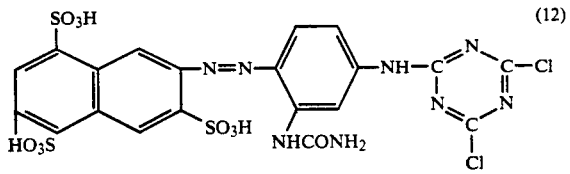

(12)

to a condensation reaction with $\beta$-($\beta'$-hydroxyethoxy)-ethylamine.

Starting compounds for the preparation of the reactive dyes of the formula (1) are, for example, the following:

(a) Diazo components of the formula (8):

1-Naphthylamine-2-, -3-, -4-, -5-, -6-, -7- and -8-sulfonic acid, 2-naphthylamine-1-, -3-, -4-, -5-, -6-, -7- and -8-sulfonic acid, 1-naphthylamine-2,4-, -2,5-, -2,7-, -2,8-, -3,5-, -3,6-, -3,7-, -3,8-, -4,6-, -4,7-, -4,8- and -5,8-disulfonic acid, 2-naphthylamine-1,5-, -1,6-, -1,7-, -3,6-, -3,7-, -4,7-, -4,8-, -5,7- and -6,8-disulfonic acid, 1-naphthylamine-2,4,6-, -2,4,7-, -2,5,7-, -3,5,7-, -3,6,8- and -4,6,8-trisulfonic acid and 2-naphthylamino-1,3,7-, -1,5,7-, -3,5,7-, -3,6,7-, -3,6,8- and -4,6,8-trisulfonic acid.

(b) Coupling components of the formula (9):

3-Aminophenylurea, 1-amino-3-ureido-6-methylbenzene, 1-amino-3-ureido-6-methoxybenzene, 1-amino-3-ureido-6-ethoxybenzene, 1-amino-3-ureido-6-ethylbenzene, 1-amino-3-ureido-6-chlorobenzene, 1-amino-3-ureido-6-trifluoromethylbenzene and 1-amino-3-ureido-6-sulfobenzene.

(c) 2,4,6-Trichloro-s-triazine (cyanuric chloride).

(d) Amine of the formula (10):

Ethanolamine, $\beta$-sulfatoethylamine, $\beta$-($\beta'$-hydroxyethoxy)-ethylamine, bis-$\beta$-hydroxyethylamine, ethylamine, N,N-diethylamine, cyclohexylamine, carboxymethylamine, N-methyl-N-carboxymethylamine, $\gamma$-N,N-dimethylamino-n-propylamine, $\beta$-methoxyethylamine, N-methyl-N-$\beta$-sulfoethylamine, N-methyl-N-$\beta$-hydroxyethylamine, N-ethyl-N-$\beta$-hydroxyethylamine, $H_2N-CH_2CH_2-O-CH_2CH_2-O-CH_2CH_2-OH$, $H_2N-(CH_2CH_2-O)_3-CH_2CH_2-OH$, $H_2N-(CH_2CH_2-O)_4-CH_2CH_2-OH$, $\beta$-hydroxyethylamine and N-methyl-N-$\beta$-($\beta'$-hydroxyethoxy)-ethylamine.

The diazotization of the diazo is as a rule carried out by the action of nitrous acid in aqueous-mineral acid solution at a low temperature, and the coupling to the coupling components is as a rule carried out at a weakly acid, neutral to weakly alkaline pH.

The condensation reactions of the 2,4,6-trichloro-s-triazine with the aminomonoazo compounds and the amino compounds of the formula (10) are preferably carried out in aqueous solution or suspension at a low temperature and a weakly acid, neutral to weakly alkaline pH, so that at least one chlorine atom still remains as a radical which can be split off in the finished reactive dye of the formula (1). The hydrogen chloride liberated during the condensation is advantageously neutralized continuously by addition of aqueous alkali metal hydroxides, carbonates or bicarbonates. Isolation of the dichlorotriazine-azo compound is in general dispensed with.

The reactive dyes of the formula (1) can be isolated and processed to useful dry dyeing preparations. The isolation is preferably carried out at the lowest possible temperature by salting out and filtration. The filtered and if appropriate desalinated dyes can be dried, if appropriate after addition of extenders and/or buffers, for example after addition of a mixture of equal parts of mono- and disodium phosphate or sodium tripolyphosphate; drying is preferably carried out at temperatures which are not too high and under reduced pressure. In certain cases, the dry preparations according to the invention can be prepared directly, that is to say without intermediate isolation of the dyes, by spray drying the entire preparation mixture.

The invention furthermore relates to storage-stable concentrated liquid dye preparations of the reactive dyes of the formula (1) and to their use for the preparation of padding liquors, dyebaths and in particular printing pastes, which are used for dyeing and printing fibre materials, in particular cellulose-containing fibre materials.

Liquid dye preparations have advantages over the powder form, for example no dust formation when preparing printing pastes or padding liquors and dye liquors, no wetting problems due to formation of lumps and no speckled dyeings due to undissolved dye particles. Such liquid formulations should be highly concentrated (dye content of at least 10% by weight and preferably more than 15% by weight) and it should be possible to store them unchanged for at least several months in a wide temperature range ($-10°$ to $+40°$ C.). The liquid formulations contain, in particular, 20 to 50, preferably 35 to 50, % by weight of dye.

The aqueous solution or suspension, containing solvent if appropriate, or an aqueous suspension of the moist press cake or filter cake of the crude dyes of varying content of undesirable dissolved substances of low molecular weight, in particular of by-products obtained during synthesis of the dye and dissolved inorganic and organic salts, obtained directly from the synthesis can be used as the starting solution or suspension for preparation of the dye preparations. In cases where the condensation product can be salted out only with extreme difficulty, if at all, the crude condensation or neutralization solution can also be used directly. Starting solutions or suspensions which contain 2 to 50% of dye are advantageously used.

However, it is also possible to use the dry crude dye powder as the starting substance, if this is first suspended in water.

The concentrated liquid preparations according to the invention are as a rule true or colloidal solutions. They are mobile (viscosity of about 5 to 300 cP/20° C.) and have a good storage stability, that is to say they remain in the ready-to-use state for at least several months at temperatures of −20° to +60° C., in particular −10° to +40° C. Either water or organic solvents and/or thickeners can be added to these preparations during preparation of padding liquors, dyebaths and printing pastes without the dye precipitating or other inhomogeneities occurring. Textile materials of naturally occurring or synthetic, in particular cellulose-containing fibre materials, for example, can be dyed or printed in a known manner using the padding liquors, dyebaths and printing pastes mentioned.

The stable concentrated liquid dye preparations according to the invention are particularly suitable for the preparation of printing pastes for printing cellulose fibre materials and for continuous dyeing processes.

One process for the preparation of a liquid preparation according to the invention is known, for example, from European Patent A-0,333,656, in which the dye solution is desalinated and concentrated on a reverse osmosis unit.

The use of membrane-related filtering techniques for the preparation of formulations of water-soluble organic dyes is known. The process starts from aqueous suspensions of the crude dye, which are largely freed from water-soluble by-products and in which the salt content is reduced to about half with the aid of a first membrane separation process; a second membrane separation process then follows.

In this first membrane separation process, the soluble by-products and some of the salts thus permeate through a membrane, whereas the dye and water-insoluble contents are retained.

In the second membrane separation process, the dye suspension is then desalinated and concentrated—if appropriate after dilution with water—and is finally converted into a ready-to-sell liquid or solid dye formulation.

The dye solutions employed according to a invention as a rule have a dye content of 5 to 20% by weight and a salt content (inorganic salts) of 1 to 20% by weight, in particular 1 to 10% by weight. The pH is as a rule in the range from 3 to 10, preferably 3 to 9. Insoluble portions are separated off by microfiltration and the concentration and desalination is carried out until a dye content of 10 to 50% by weight is reached. During this procedure, the salt content drops to below 5% by weight, for example 0.05 to 5% by weight, and preferably below 1% by weight, for example 0.05 to 1% by weight.

To prepare a ready-to-sell liquid form the concentrated aqueous dye formulation is to be brought to a given final dye content merely by dilution and/or with the aid of extenders, if appropriate after addition of the components customary for liquid formulations, such as solubilizers, foam suppressants, antifreeze agents, humectants, surfactants, buffer substances and/or antimicrobial agents, and after adjustment of the pH. However, the dye formulation can also be converted into a solid dye preparation by dehydration, if appropriate after addition of additives, such as binders, dust removal agents, wetting agents, buffer substances, such as alkali metal polyphosphates, disodium hydrogen phosphate, citric acid and/or ethylenediaminetetraacetic acid, and/or extenders. Because of the increased dye concentration, less energy is required for drying. Customary drying processes, in particular spray drying, are used.

The pH of the ready-to-sell liquid formulation of the reactive dyes is as a rule adjusted by addition of buffer substances. The pH is in the range of about 7.0 to 8.5, preferably 8.0. It is of course possible for the dyeing assistants or additives mentioned not only to be added to the dye solution before final formulation thereof as the commercial form but to be introduced into the solution of the crude dye even before or during the process according to the invention, and they are thus at least in some cases already present in the dye solution from which the final ready-to-sell dye formulation is prepared (for example solubilizers, solvents, surfactants etc.). Addition during the process is of course only appropriate if the dyeing assistant or assistants or additive or additives are not removed completely again from the solution by one of the membrane separation processes.

The concentrated liquid preparations, according to the invention, of the reactive dyes of the formula (1) thus contain 10 to 50% by weight of dye, 0.05 to 5% by weight of an inorganic salt, for example NaCl, KCl or LiCl, buffer substances, for example mono- and disodium phosphate or sodium tripolyphosphate or mixtures of buffer substances, in an amount such that a pH of between 7.0 and 8.5 can be established and water.

The reactive dyes of the formula (1) are distinguished by a high reactivity, and they produce dyeings of good wet and light fastness properties. It is to be particularly emphasized that the dyes display a good solubility and high fixing of the dye, that they diffuse well into the cellulose fibre and that the non-fixed portions can easily be removed.

The reactive dyes of the formula (1) are suitable for dyeing and printing widely varying materials, such as silk, leather, wool, polyamide fibres and polyurethanes, but in particular cellulose-containing materials of a fibrous structure, such as linen, cellulose, regenerated cellulose and especially cotton. They are suitable both for the exhaustion process and for dyeing by the pad-dyeing process, in which the goods are impregnated with aqueous dye solutions, which if appropriate also contain salts, and the dyes are fixed, if appropriate under the action of heat, after an alkali treatment or in the presence of alkali.

They are particularly suitable for printing textile cellulose-containing fibre materials, especially cotton, and likewise also for printing nitrogen-containing fibres, for example wool, silk or mixed fabrics containing wool.

The dyes according to the invention are distinguished in particular by a very good capacity for combination; the resulting prints are distinguished that in combination with other dyes, for example in combination with a blue-dyeing dye, no two-sidedness occurs, that is to say the resulting print is constant in shade.

It is advisable to subject the dyeings and prints to thorough rinsing with cold and hot water, if appropriate with the addition of a dispersing agent which promotes diffusion of the non-fixed portions.

When used in practice, the dyes according to the invention are advantageously employed as liquid dyeing or printing preparations.

The preparation of the monoazo intermediates is not described in all cases in the embodiment examples which follow, but can be ascertained without problems from the above comments.

In the following examples, the parts are by weight.

EXAMPLE 1

585 parts of 7-[4-(4,6-dichloro-1,3,5-triazin-2-yl-amino)-2-ureidophenyl-azo]-1,3,6-naphthalenetrisulfonic acid, prepared by a known process, are dissolved in 5000 parts of water at 8° C. and pH 4.5 by addition of sodium hydroxide solution. A mixture of 79 parts of ethanolamine with 70 parts of water is added dropwise so that the pH does not rise above 7.5. During this procedure, the temperature rises to about 20° C. The mixture is then heated at about 40° C. for 2 hours, during which the pH is kept constant by addition of 195 parts of 5N sodium hydroxide solution. The dissolved dye of the formula

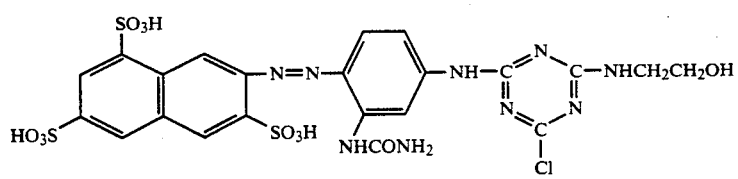

(101)

is precipitated by addition of 550 parts of sodium chloride and isolated.

Very fast golden yellow prints or dyeings are obtained—when applied to cotton by the customary process.

EXAMPLE 2

67 parts of ethanolamine are added dropwise to a suspension of 184 parts of cyanuric chloride in 1000 parts by volume of water at 0° to 5° C. so that the pH is kept at 5.0. The pH is then kept further at 5.0 to 5.5 by addition of 100 parts by volume of 10N sodium hydroxide solution. In the meantime, 546 parts of 7-(4-amino-2-ureidophenyl-azo)-naphthalene-1,3,6-trisulfonic acid, prepared by a known process, are dissolved in 4000 parts by volume of water under neutral conditions. This solution is allowed to run into the solution of the condensation product prepared above. The reaction solution is now heated at 40° to 45° C, for 2 to 3 hours, and at the same time the pH is kept at 7.5 by dropwise addition of 110 parts by volume of 10N sodium hydroxide solution. The same dye as is obtained in Example 1 can be isolated from the resulting dye solution by addition of 500 parts of sodium chloride.

If the procedure is as described in Example 1 or 2 but the amines shown in the second column are used for replacement of the second chlorine atom on the triazine ring, useful dyes which dye cotton in yellow to reddish-tinged yellow shades are likewise obtained.

| Example No. | Amine | Colour shade |
| --- | --- | --- |
| 3 | β-Sulfatoethylamine | yellow |
| 4 | β-(β'-Hydroxyethoxy)-ethylamine | yellow |
| 5 | Bis-β-hydroxyethylamine | yellow |
| 6 | Ethylamine | yellow |
| 7 | N,N-Diethylamine | yellow |
| 8 | Cyclohexylamine | yellow |
| 9 | Carboxymethylamine | yellow |
| 10 | N-Methyl-carboxy-methylamine | yellow |
| 11 | γ-N,N-Dimethylamino-n-propylamine | yellow |
| 12 | β-Methoxy-ethylamine | yellow |
| 13 | N-Methyl-β-sulfoethylamine | yellow |
| 14 | N-Methyl-N-β-hydroxyethylamine | yellow |
| 15 | N-Ethyl-N-β-hydroxyethylamine | yellow |
| 16 | H$_2$N-(CH$_2$CH$_2$O)$_2$-CH$_2$CH$_2$-OH | yellow |
| 17 | H$_2$N-(CH$_2$CH$_2$O)$_3$-CH$_2$CH$_2$-OH | yellow |
| 18 | H$_2$N-(CH$_2$CH$_2$O)$_4$-CH$_2$CH$_2$-OH | yellow |

If the procedure is as described in Example 1 or 2 but an equimolar amount of 7-[4-(4,6-dichloro-1,3,5-triazin-2-yl-amino)-2-ureidophenyl-azo]-1,5-naphthalenedisulfonic acid is used as the chromophore and the amines shown in the second column are used for replacement of the second chlorine atom on the triazine ring, useful dyes which dye cotton in yellow to reddish-tinged yellow shades are likewise obtained.

| Example No. | Amine | Colour shade |
| --- | --- | --- |
| 19 | β-Hydroxyethylamine | yellow |
| 20 | β-Sulfatoethylamine | yellow |
| 21 | β-(β'-Hydroxyethoxy)-ethylamine | yellow |
| 22 | Bis-β-hydroxyethylamine | yellow |
| 23 | Ethylamine | yellow |
| 24 | N,N-Diethylamine | yellow |
| 25 | Cyclohexylamine | yellow |
| 26 | Carboxymethylamine | yellow |
| 27 | N-Methyl-carboxy-methylamine | yellow |
| 28 | γ-N,N-Dimethylamino-n-propylamine | yellow |
| 29 | β-Methoxy-ethylamine | yellow |
| 30 | N-Methyl-β-sulfoethylamine | yellow |
| 31 | N-Methyl-N-β-hydroxyethylamine | yellow |
| 32 | N-Aethyl-N-β-hydroxyethylamine | yellow |
| 33 | H$_2$N-(CH$_2$CH$_2$O)$_2$-CH$_2$CH$_2$-OH | yellow |
| 34 | H$_2$N-(CH$_2$CH$_2$O)$_3$-CH$_2$CH$_2$-OH | yellow |
| 35 | H$_2$N-(CH$_2$CH$_2$O)$_4$-CH$_2$CH$_2$-OH | yellow |

If the procedure is as described in Example 1 or 2 but an equimolar amount of 7-[4-(4,6-dichloro-1,3,5-triazin-2-yl-amino)-2-ureidophenyl-azo]-1,3,5-naphthalenetrisulfonic acid is used as the chromophore and the amines shown in the second column are used for replacement of the second chlorine atom on the triazine ring, useful dyes which dye cotton in yellow to reddish-tinged yellow shades are likewise obtained.

| Example No. | Amine | Colour shade |
| --- | --- | --- |
| 36 | β-Hydroxyethylamine | yellow |
| 37 | β-Sulfatoethylamine | yellow |
| 38 | β-(β'-Hydroxyethoxy)-ethylamine | yellow |
| 39 | Bis-β-hydroxyethylamine | yellow |
| 40 | Ethylamine | yellow |
| 41 | N,N-Diethylamine | yellow |
| 42 | Cyclohexylamine | yellow |
| 43 | Carboxymethylamine | yellow |

-continued

| Example No. | Amine | Colour shade |
|---|---|---|
| 44 | N-Methyl-carboxy-methylamine | yellow |
| 45 | γ-N,N-Dimethylamino-n-propylamine | yellow |
| 46 | β-Methoxy-ethylamine | yellow |
| 47 | N-Methyl-β-sulfoethylamine | yellow |
| 48 | N-Methyl-N-β-hydroxyethylamine | yellow |
| 49 | N-Ethyl-N-β-hydroxyethylamine | yellow |
| 50 | $H_2N-(CH_2CH_2O)_2-CH_2CH_2-OH$ | yellow |
| 51 | $H_2N-(CH_2CH_2O)_3-CH_2CH_2-OH$ | yellow |
| 52 | $H_2N-(CH_2CH_2O)_4-CH_2CH_2-OH$ | yellow |

DYEING INSTRUCTIONS 1

2 parts of the dye obtained according to Example 1 are dissolved in 100 parts of water at 20° to 50° C. with the addition of 5 to 20 parts of urea and 2 parts of anhydrous $Na_2CO_3$. A cotton fabric is impregnated with the resulting solution so that it increases by 60 to 80% of its weight, and is then dried. Thereafter, the dyeing is thermofixed at 140° to 210° C. for 1½ to 5 minutes and is then soaped in a 0.1% solution of an ion-free detergent at the boiling point for a quarter of an hour, rinsed and dried.

DYEING INSTRUCTIONS 2

2 parts of the dye obtained according to Example 1 are dissolved in 2000 parts of water at 75° C. with the addition of 120 parts of NaCl or anhydrous $Na_2SO_4$. 100 parts of a cotton fabric are introduced into this dyebath and the temperature is kept constant for 30 to 60 minutes. Thereafter, 10 parts of anhydrous $Na_2CO_3$ and 4 ml of 30% sodium hydroxide solution are added. The temperature is kept at 75° to 80° C. for a further 45 to 60 minutes and the dyeing is then soaped in a 0.1% solution of an ion-free detergent at the boiling point for 15 minutes, rinsed and dried.

DYEING INSTRUCTIONS 3

2 parts of the dye obtained according to Example 1 are dissolved in 100 parts of water with the addition of 0.5 part of sodium m-nitrobenzenesulfonate. A cotton fabric is impregnated with the resulting solution so that it increases by 75% of its weight, and is then dried. Thereafter, the fabric is impregnated with a warm solution, at 20° C., containing 5 g of sodium hydroxide and 300 g of sodium chloride per liter and squeezed off to a weight increase of 75%, and the dyeing is steamed at 100° to 101° C. for 30 seconds, rinsed, soaped in a 0.3% solution of an ion-free detergent at the boiling point for a quarter of an hour, rinsed and dried.

DYEING INSTRUCTIONS 4

2 parts of the dye obtained according to Example 1 are dissolved in 100 parts of water. The solution is added to 1900 parts of cold water, 60 parts of sodium chloride are added and 100 parts of a cotton fabric are introduced into this dyebath. The temperature is increased to 60° C., 40 parts of anhydrous $Na_2CO_3$ and a further 60 parts of sodium chloride being added after 30 minutes. The temperature is kept at 60° C. for 30 minutes and the dyeing is rinsed and then soaped in a 0.3% solution of an ion-free detergent at the boiling point for 15 minutes, rinsed and dried.

PRINTING INSTRUCTIONS 2 parts of the dye prepared according to Example 1 are sprinkled, with rapid stirring, into 100 parts of a stock thickener containing 45 parts of 5% sodium alginate thickener, 32 parts of water, 20 parts of urea, 1 part of sodium m-nitrobenzenesulfonate and 2 parts of sodium carbonate. A cotton fabric is printed on a roller printing machine with the printing paste thus obtained and the resulting printed material is steamed at 100° C. in saturated steam for 4 to 8 minutes. The printed fabric is then rinsed thoroughly in cold and hot water, during which the portions which have not been fixed chemically can be removed very easily from the fibre, and is then dried.

What is claimed is:

1. A reactive dye of the formula

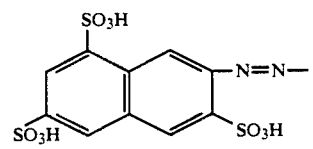

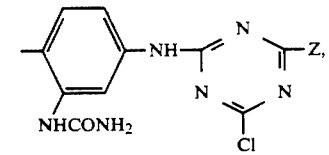

in which Z is β-sulfatoethylamino, β-(β'-hydroxyethoxy)-ethylamino, β-(β'-sulfatoethoxy)-ethylamino, hydroxymethoxymethylamino, sulfatomethoxymethylamino, N-methyl-N-β-hydroxyethylamino, N-methyl-N-β-sulfatoethylamino, N-ethyl-N-β-hydroxyethylamino, N-ethyl-N-β-sulfatoethylamino, N,N-di-(β-sulfatoethyl)-amino, $-NH-(CH_2CH_2-O)_2-CH_2CH_2-OH$, $-NH-(CH_2CH_2-O)_3-CH_2CH_2-OH$, $-NH-(CH_2CH_2-O)_4-CH_2CH_2-OH$ or N-methyl-N-β-(β'-hydroxyethoxy)-ethylamino.

2. The reactive dye according to claim 1, of the formula

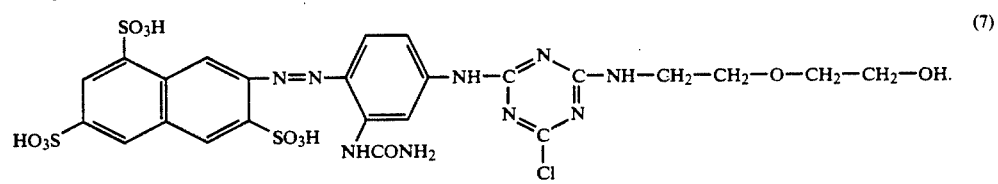

* * * * *